United States Patent [19]
Codilian et al.

[11] Patent Number: 6,014,283
[45] Date of Patent: Jan. 11, 2000

[54] NON-QUADRATURE SERVO BURST PATTERN FOR MICRO-JOGGING A MAGNETORESISTIVE HEAD IN A MAGNETIC DISK DRIVE

[75] Inventors: Raffi Codilian, San Dimas; Ara W. Nazarian, Tustin; David Dung Tien Nguyen, Fountain Valley, all of Calif.

[73] Assignee: Western Digital Corporation, Irvine, Calif.

[21] Appl. No.: 08/856,670

[22] Filed: May 15, 1997

[51] Int. Cl.⁷ .................................................. G11B 5/596
[52] U.S. Cl. ..................................... 360/77.08; 360/77.02
[58] Field of Search ............................. 360/77.08, 78.04, 360/77.01, 77.07, 77.02, 78.14, 48, 76, 75

[56] References Cited

U.S. PATENT DOCUMENTS

| | | | |
|---|---|---|---|
| 4,048,660 | 9/1977 | Demmison et al. | 360/77 |
| 4,101,942 | 7/1978 | Jacques | 360/77 |
| 4,157,577 | 6/1979 | Porter, Jr. et al. | 360/77 |
| 4,238,809 | 12/1980 | Fujiki et al. | 360/131 |
| 4,354,210 | 10/1982 | Droux | 360/77 |
| 4,380,033 | 4/1983 | Bacrania | 360/77 |
| 4,396,960 | 8/1983 | Matia et al. | 360/77 |
| 4,454,549 | 6/1984 | Pennington | 360/77 |
| 4,488,187 | 12/1984 | Alaimo | 360/77 |
| 4,549,232 | 10/1985 | Axmear et al. | 360/77 |
| 4,598,327 | 7/1986 | Jen et al. | 360/77 |
| 4,613,915 | 9/1986 | Crouse et al. | 360/77 |
| 4,833,551 | 5/1989 | Song | 360/77.05 |
| 4,835,632 | 5/1989 | Shih et al. | 360/78.04 |
| 4,924,334 | 5/1990 | Diepers et al. | 360/77.07 |
| 5,041,926 | 8/1991 | Ockerse et al. | 360/77.05 |
| 5,072,318 | 12/1991 | Yu | 360/77.02 |
| 5,095,393 | 3/1992 | Janz | 360/77.05 |
| 5,138,511 | 8/1992 | Hoshimi et al. | 360/135 |
| 5,164,866 | 11/1992 | Sano et al. | 360/77.08 |
| 5,235,478 | 8/1993 | Hoshimi et al. | 360/77.08 |
| 5,257,149 | 10/1993 | Meyer | 360/78.14 |
| 5,327,408 | 7/1994 | Belser | 369/44.26 |
| 5,369,535 | 11/1994 | Hetzler | 360/78.14 |
| 5,381,281 | 1/1995 | Shrinkle et al. | 360/77.08 |
| 5,400,201 | 3/1995 | Pederson | 360/135 |
| 5,418,670 | 5/1995 | McClure et al. | 360/131 |
| 5,500,776 | 3/1996 | Smith | 360/77.04 |
| 5,521,773 | 5/1996 | Suzuki et al. | 360/77.04 |
| 5,523,902 | 6/1996 | Pederson | 360/77.08 |
| 5,526,202 | 6/1996 | Blageila et al. | 360/77.08 |
| 5,587,850 | 12/1996 | Ten-that | 360/77.08 |
| 5,786,957 | 7/1998 | Inoue et al. | 360/77.08 |

*Primary Examiner*—Thang V. Tran
*Attorney, Agent, or Firm*—Leo J. Young; Milad G. Shara

[57] ABSTRACT

A magnetic storage disk drive having a servo burst pattern which asymmetrically increases the linear region in which a read head may be micro-jogged from a burst pair center line to align the read head with a data track. The innovative servo pattern comprises a first pair of servo bursts that define a first burst pair centerline for writing a particular data track to a data track side of the first centerline, and a second pair of servo bursts collectively define a second burst pair centerline that is positioned to the data track side of the first burst pair centerline and is sufficiently close to the first burst pair center line so that the read head "sees" the second pair of servo bursts before "losing" the first pair of servo bursts when micro-jogged to the data track side for reading. The second burst pair centerline should be no farther from the first burst pair centerline than the linear read width of the read head. The preferred servo bursts span a full track pitch are arranged in a uniformly repeating pattern of A/B and C/D burst pairs. The first burst pair centerline may be defined by the A/B pairs in one annular disk region and by the C/D burst pairs in another annular disk region in order to asymmetrically expand the linear region in the direction needed for micro-jogging the read head in different directions within the respective annular regions.

16 Claims, 7 Drawing Sheets

(PRIOR ART)

NON-QUADRATURE SERVO BURST PATTERN FOR MICRO-JOGGING A MAGNETORESISTIVE HEAD IN A MAGNETIC DISK DRIVE

BACKGROUND OF THE INVENTION

1. Field of the Present Invention

The present invention relates generally to a magnetic disk drive ("disk drive"), and more particularly to a unique servo pattern for micro-jogging a magnetoresistive transducer head during a read operation.

2. Description of the Related Art

A conventional disk drive has a head disk assembly ("HDA") including at least one magnetic disk ("disk"), a spindle motor for rapidly rotating the disk, and a head stack assembly ("HSA") that includes a transducer head for reading and writing data. The transducer head is controllably positioned by a servo system in order to read or write information from or to particular tracks on the disk. The typical HSA has two primary portions: (1) An actuator assembly that moves in response to the servo control system and (2) A head gimbal assembly ("HGA") that extends from the actuator assembly and biases the head toward the disk. The typical HSA further includes a flex circuit on the side of the actuator body and electrical conductors which run between the flex circuit and the head to transmit read and write signals to and from the head.

The industry presently prefers a "rotary" or "swing-type" actuator assembly which conventionally comprises an actuator body that rotates on a pivot assembly between limited positions, a coil that extends from one side of the actuator body to interact with a pair of permanent magnets to form a voice coil motor, and an actuator arm that extends from the opposite side of the actuator body to support the HGA.

Each surface of each disk conventionally contains a plurality of concentric tracks of servo data segments and user data segments that are alternately located around each track to define a corresponding plurality of servo wedges and corresponding data wedges. The servo data comprises track ID fields and servo bursts (an alternating pattern of magnetic transitions) which are used by the servo system to align the transducer head with a particular data track. The servo control system moves the transducer head toward a desired track during a "seek" mode based on the track ID field. Once the transducer head is over the desired track, the servo control system enters a "track follow" mode and uses the servo bursts to keep the transducer head over the data.

For many years, the industry used inductive heads where the same transducer is used for reading and writing. More recently, however, the industry has begun using magnetoresistive transducers which are only capable of reading. Therefore, two separate heads—an inductive head for writing and a magnetoresistive head for reading—are required. The separate read and write heads are necessarily spaced one behind the other. A variable skew between the two heads is introduced by this spacing due to the tangential relationship of the transducers to a circular data track on the disk as they are positioned over the disk from inner to outer tracks. The relative positions of the two heads may be set during manufacturing process to bias the skew so that the heads may be, for example, aligned when positioned over the innermost tracks and skewed when positioned over the outermost tracks or other arrangements suitable for a particular design objective. Manufacturing tolerances can also cause a small shift in the relative centerlines of the heads with respect to one another.

A problem exists with using the magnetoresistive transducer head, therefore, because the servo bursts are read with the magnetoresistive read head but the data tracks are written with the inductive write head that is skewed or variably displaced from the read head depending on the radial position over the disk. As a result of this physical displacement between the two heads, it is necessary to offset or "micro-jog" the transducer head during the read operation or during the write operation.

The servo control system usually aligns the read head with the adjacent edges of a servo burst pair while writing, rather than reading so that the data is written while track following on the equal signal "center line" of the servo burst pair. For reference in this disclosure, the equal signal center line may be termed a "burst pair center line" of a selected pair of servo bursts. The read head converts the amplitude of each burst to an electrical signal which will be used by a disk microprocessor to determine the required control effort or correction needed to track follow. In such case, the center line of the data track may be displaced from the burst pair center line of the servo burst pair by the physical displacement between the read and write heads at that particular radius. Later, when reading the data, the servo control system micro-jogs the read head away from the burst pair center line of the two bursts in the same direction as the original physical displacement so that the read head passes over the center line of the data track in order to maximize the amplitude of data signals read from the disk thereby increasing the signal-to-noise ratio.

A continuing problem is that the magnetoresistive read head is narrow compared to the write head, and therefore has a limited range of linearity across a full track as it reads a sequence of bursts to provide a position error signal. In other words, as the read head position is displaced from the center line of a servo burst pair, there is a relatively small amount of displacement over which the signal produced by the servo bursts remains linearly related. In the inventors' experience, the magnetoresistive read head can only be displaced from the center line of a servo burst pair by about ⅙ or 16.67 percent of a track pitch (the distance between center lines of adjacent tracks) and still remain within a useable range of linearity.

Depending on the relative size of the read and write heads, their longitudinal position, and their lateral position, however, the skew or relative displacement between the read and write transducers may vary by more than 16.67 percent of a track pitch as the swing-type actuator moves the heads from the inside diameter to the outside diameter of the disk. If we adopt a convention wherein we speak of the write head's displacement relative to the read head, and wherein a positive displacement means the write head is located farther to an outside diameter than the read head, the inventors have found that the displacement range can be as large as −45 percent to +45 percent of a track pitch as the actuator moves the transducer from the inside diameter to the outside diameter.

One prior patent attempting to address the narrow region of linearity available when micro-jogging a magnetoresistive transducer is U.S. Pat. No. 5,587,850 (the '850 patent) issued to Luan Ton—that on Dec. 24, 1996, and assigned to Quantum Corporation. The '850 patent generally teaches a servo sector arrangement where a group of servo burst patterns which are each ⅔ of a track pitch wide have centers which are offset from each other by one-third of a track pitch in a "quadrature" fashion where each successive burst overlaps a previous burst by one-half of a burst width. By offsetting the bursts from a track identification field by a "micro-jog" distance, the read head can track on the centerline of a burst pair while the write head is positioned at the data track centerline. Necessarily during read operations, the servo must track follow at a point which is offset from the burst pair centerline and is therefore dependent on operating within a linear response range. This will be limited in the case presented by the '850 patent, as indicated in column 8 lines 55–57, to 16% of the track pitch. In current disk drives having even higher track density, the linear response range may be in the range of 32% (±16%) of a track pitch. As indicated above however, the relative displacement of the read and write heads to the track centerline can vary from −45% to +45% of track pitch. Therefore the servo pattern of the '850 patent would not provide sufficient linear response range. Additionally, as indicated above, the burst width suggested by the '850 patent is on the order of ⅔ of a track pitch. This generally means that the servo writer must make more passes to write the narrow ⅔ track pitch servo bursts compared to conventional servo burst patterns which are as wide as the track pitch, even though the servo writing process is already considered a bottleneck in manufacturing disk drives.

Accordingly, there is a need for a disk drive with a servo burst pattern which provides extended linear response for micro-jogging regions over selected portions of the disk without an increase in servo writing time during manufacture to accommodate narrow width servo bursts.

SUMMARY OF THE INVENTION

The invention generally comprises a servo pattern for a magnetic storage disk drive which increases the linear range of radial distance in which a read head may be micro-jogged from a burst pair center line. The innovative servo pattern comprises a first pair of servo bursts that collectively define a first burst pair centerline for writing a particular data track to a data track side of the first centerline, and a second pair of servo bursts that collectively define a second burst pair centerline that is positioned to the data track side of the first burst pair centerline and is sufficiently close to the first burst pair center line so that an asymmetrical micro-jogging region is defined extending a first distance away from the data track and a second greater distance towards the data track. The read head may then be micro-jogged farther than otherwise possible in the data track direction to center the read head on the data track while reading data. The servo bursts each preferably span a full track pitch.

The invention more specifically resides in a magnetic storage disk drive having a disk with a plurality of concentric data tracks, a read head having a finite linear response width and a write head, the invention comprising a servo burst pattern for increasing the radial distance in which the read head may be micro-jogged from a burst pair centerline. The servo burst pattern comprises a first pair of servo bursts that each span a full track pitch and collectively define a first burst pair centerline associated with a particular data track, the read head being centered on the first burst pair centerline to write data on the particular data track with a write head that is skewed from the read head relative to the first burst pair centerline and a second pair of servo bursts that each span a full track pitch and collectively define a second burst pair centerline that is located within the finite linear response width of the read head relative to the first burst pair centerline and closer to the first burst pair centerline associated with the particular data track than to a burst pair centerline associated with an adjacent data track to define an asymmetrical micro-jogging region relative to the first burst pair centerline that extends a first distance from the first burst pair centerline in an inverse data track direction away from the particular data track and the second burst pair centerline and a second greater distance from the first burst pair centerline in a data track direction toward the particular data track and the second burst pair centerline.

As a result of this invention, the read head may be micro-jogged farther than otherwise possible in the data track direction to center the read head on the particular data track while reading data.

DETAILED DESCRIPTION OF THE PREFERRED EMBODIMENTS

Figure 1A:
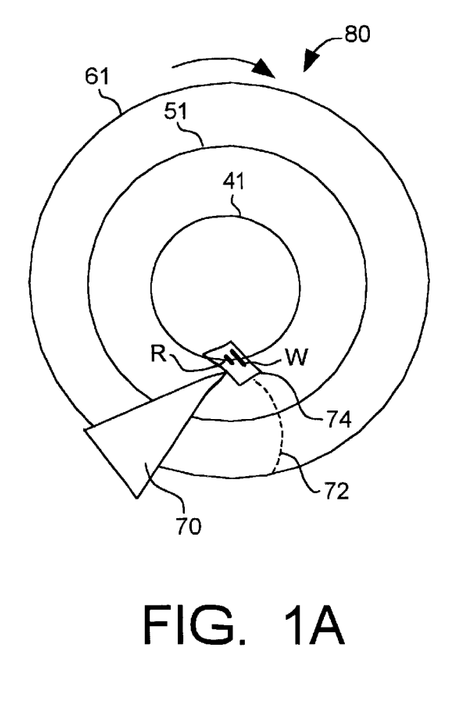
FIGS. 1A, 1B, and 1C are diagrammatic views of one arm 70 of a swing-type actuator assembly carrying a magnetoresistive transducer 74 with separate read and write heads, R, W, and showing how the radial displacement varies between the heads as the transducer 74 is moved from an inside diameter 41 to an outside diameter 61.
Figure 1B:
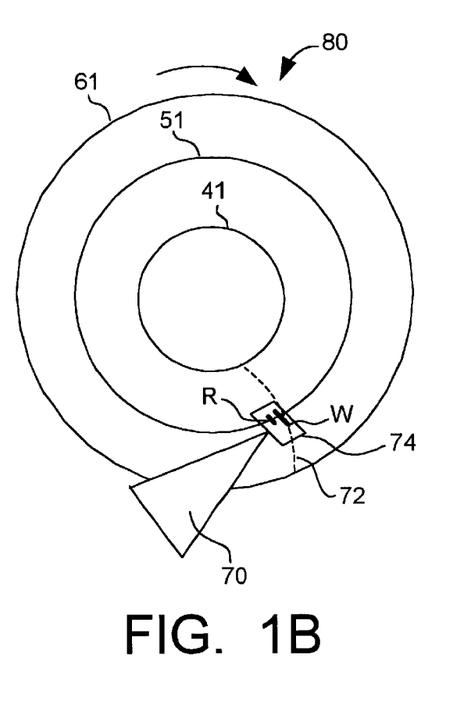
Figure 1C:
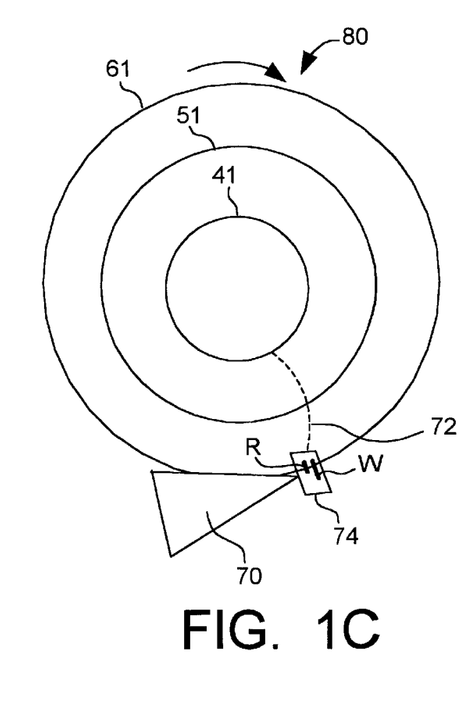

As shown in FIGS. 1A to 1C, a transducer 74 has a magnetoresistive read head R and an inductive write head W that are longitudinally spaced apart from one another. The inductive write head W is conventionally wider than the magnetoresistive read head R, forming a so-called "write wide-read narrow" system. If the transducer 74 is carried at the far end of an arm 70 of a swing-type actuator assembly, as shown, then the read and write heads R, W are variably skewed relative to a track passing under the head as the arm 70 swings through an arc 72 from an inside diameter 41 to an outside diameter 61 of a disk 80. The write head W may be skewed towards the inside diameter side of the read head R when the arm 70 is located at an inside diameter 41 shown in FIG. 1A; aligned with the read head R when the arm 70 is at a middle diameter 51 as shown in FIG. 1B; and skewed toward the outside diameter side of the read head R when the arm 70 is at an outside diameter 61 as shown in FIG. 1C. The amount by which the center of write head W is radially skewed from the center of read head R relative to a track center may be stated as a displacement which is expressed in percentage of a track pitch and may be considered negative when the write head W is inside of the read head R and positive when the write head W is outside of the read head R.

Figure 2:
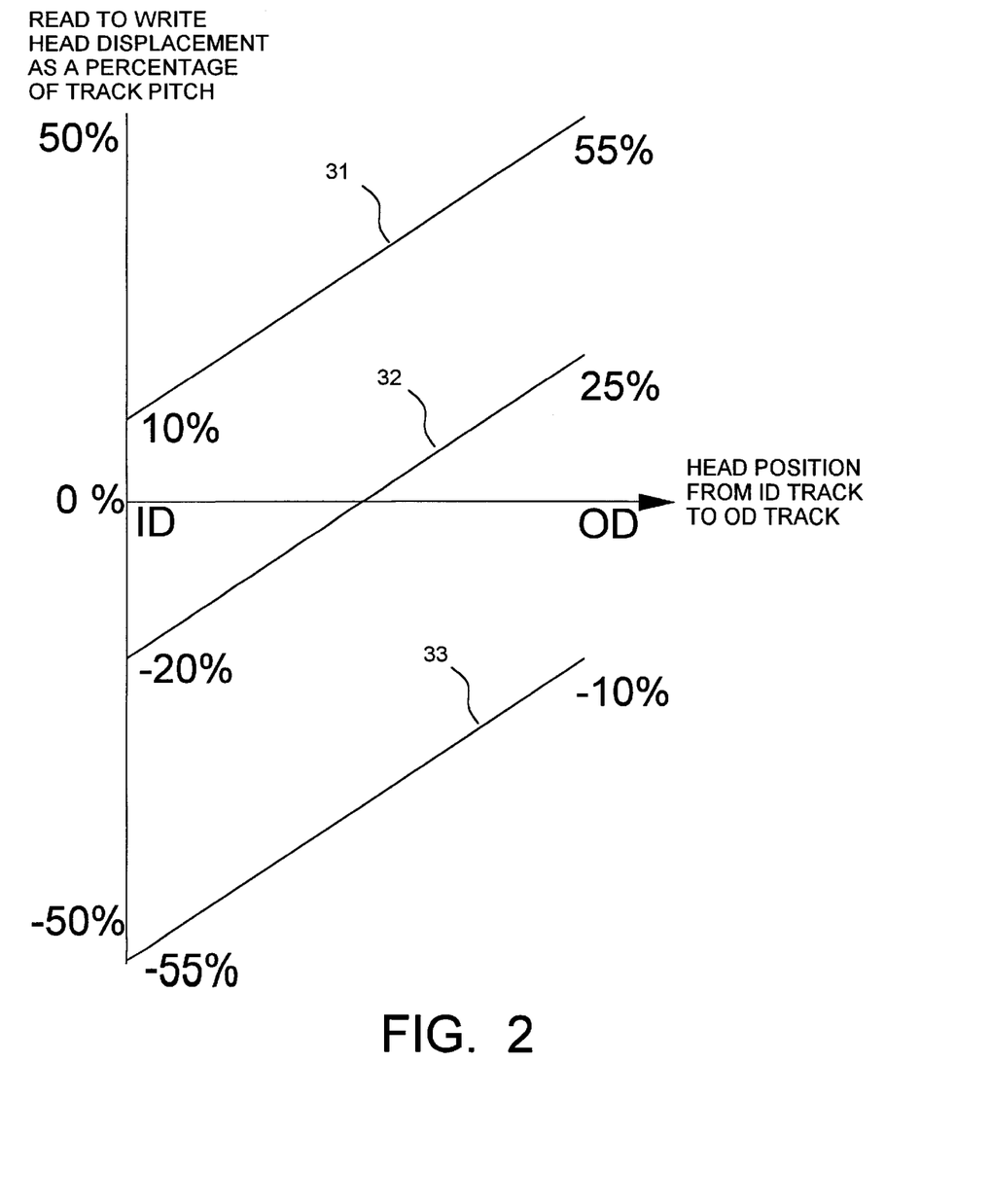
FIG. 2 is a graph showing the three possible scenarios for the amount of radial displacement of the write head W relative to the read head R as the arm 70 moves the transducer 74 from an inside diameter to an outside diameter assuming, as is conventional, that the write head W is located farther out on the arm 70 than is the read head R.

FIG. 2 shows some possible scenarios of variable skew between the write head W and the read head R as a function of radial position varying from a track located at the inner diameter of the disk to a track located at the outer diameter of the disk as shown in FIGS. 1A, 1B and 1C. The middle line 32 shows the displacement varying from −20% to +25% and corresponds to the circumstance of FIGS. 1A to 1C. In such case, the write head W skew crosses over from the inside to the outside of the read head R. It is possible, of course, to change the static lateral displacement of the write head W relative to the read head R, to vary the swing path 72, or both, to prevent crossover and make the displacement vary from a positive percentage (e.g. 10%) to a more positive percentage e.g. (55%) as shown by the upper line 31 of FIG. 2 or from a negative percentage (e.g. −55%) to a less negative percentage (e.g. −10%) as shown by the lower line 33 of FIG. 2.

As explained above, the servo control system positions the transducer 74 by reading servo bursts with the read head R and writes user data by writing transitions with the write head W. The servo control system generally positions the write head W to write data to a particular track by aligning the read head R with the burst pair center line. The data is then written offset to a "data track side" of the burst pair center line. For reading, therefore, the servo control system must move the read head R in the direction that the data track was originally written relative to the burst pair center line. The servo system, therefore, moves the read head R to track follow a "micro-jog" percentage off-track from a selected burst pair centerline towards the data track side of the burst pair centerline so that the read head R travels along the centerline of the written data track.

Figure 3:
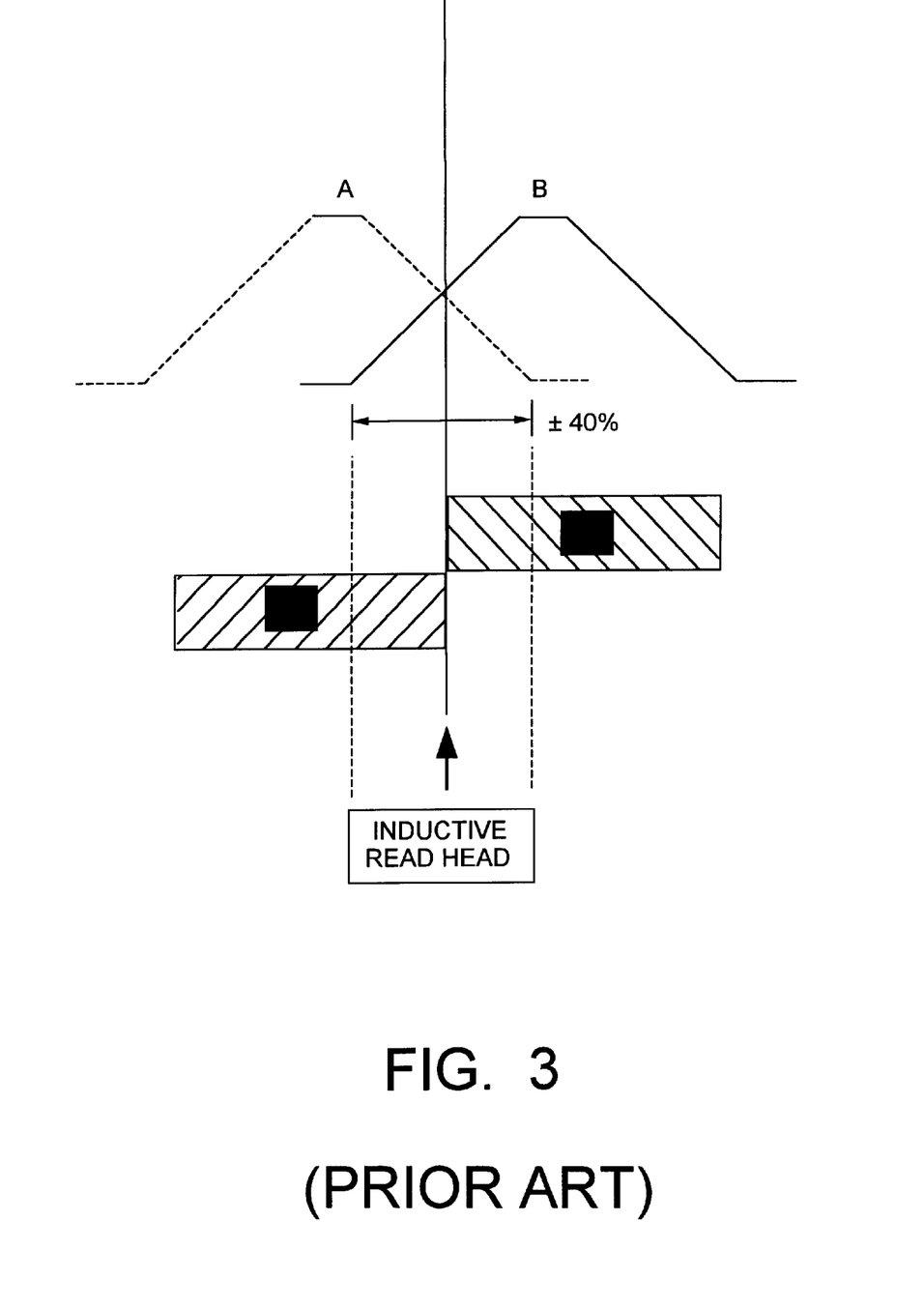
FIG. 3 is a graph of the signals imparted to an inductive read head by a pair of servo bursts and as a function of radial position where the read head has a physical width that is 80% of a track pitch and has a linear width that is ±40% of a track pitch relative to the signal crossing position which defines a burst pair centerline.
Figure 4:
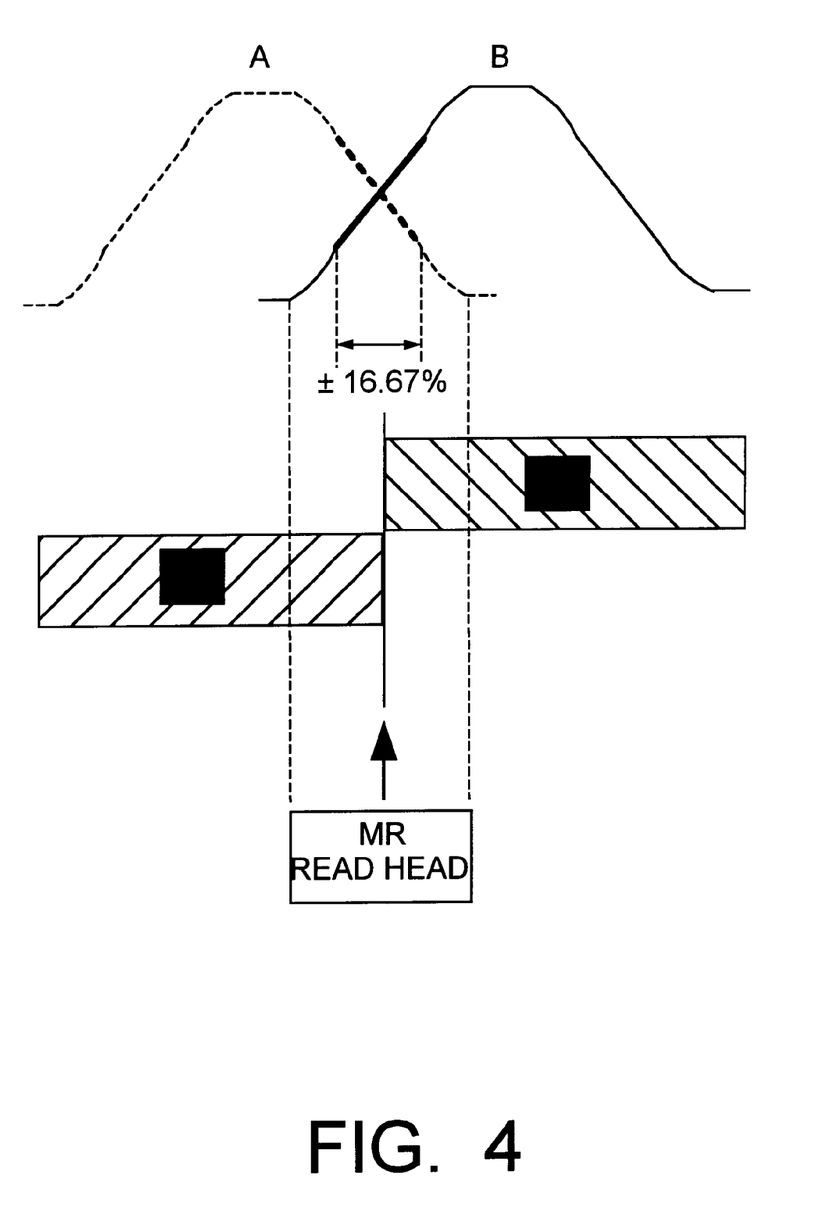
FIG. 4 is a graph of the signals imparted to a magnetoresistive read head by a pair of servo bursts and as a function of radial position where the read head has a physical width that is 60% of a track pitch but has a finite linear response width (thick lines) that is only about ±16.67% of a track pitch relative to the signal crossing position which defines a burst pair centerline.

FIG. 3 shows the servo signals generated in a prior art inductive read head that is 80% of a track pitch in width and is passing over a pair of full width servo bursts A/B. The "linear width" of an inductive read head generally corresponds to its physical width. Accordingly, the magnetic centerline of the inductive read head can by moved about ±40% of a track pitch from a burst pair centerline defined by the pair of servo bursts. If a second pair of servo bursts were present in a standard quadrature pattern where the burst pair centerlines are separated by 50% of a track pitch, then the inductive read head would always pass over a linear portion of one or both servo burst pairs. As shown in FIG. 4, however, the servo signals generated by a magnetoresistive read head R whose width is 60% of a track pitch are typically only linear for a limited range of about ±16.67% (thick lines) relative to the signals which are generated when the magnetic center of the read head R is positioned on the burst pair center line. If the radial displacement of the write head W exceeds the ±16.67% linear "response width" or displacement range of the read head R, then the servo control system will not be able to accurately micro-jog the read head R over the data track and track follow.

Figure 5:
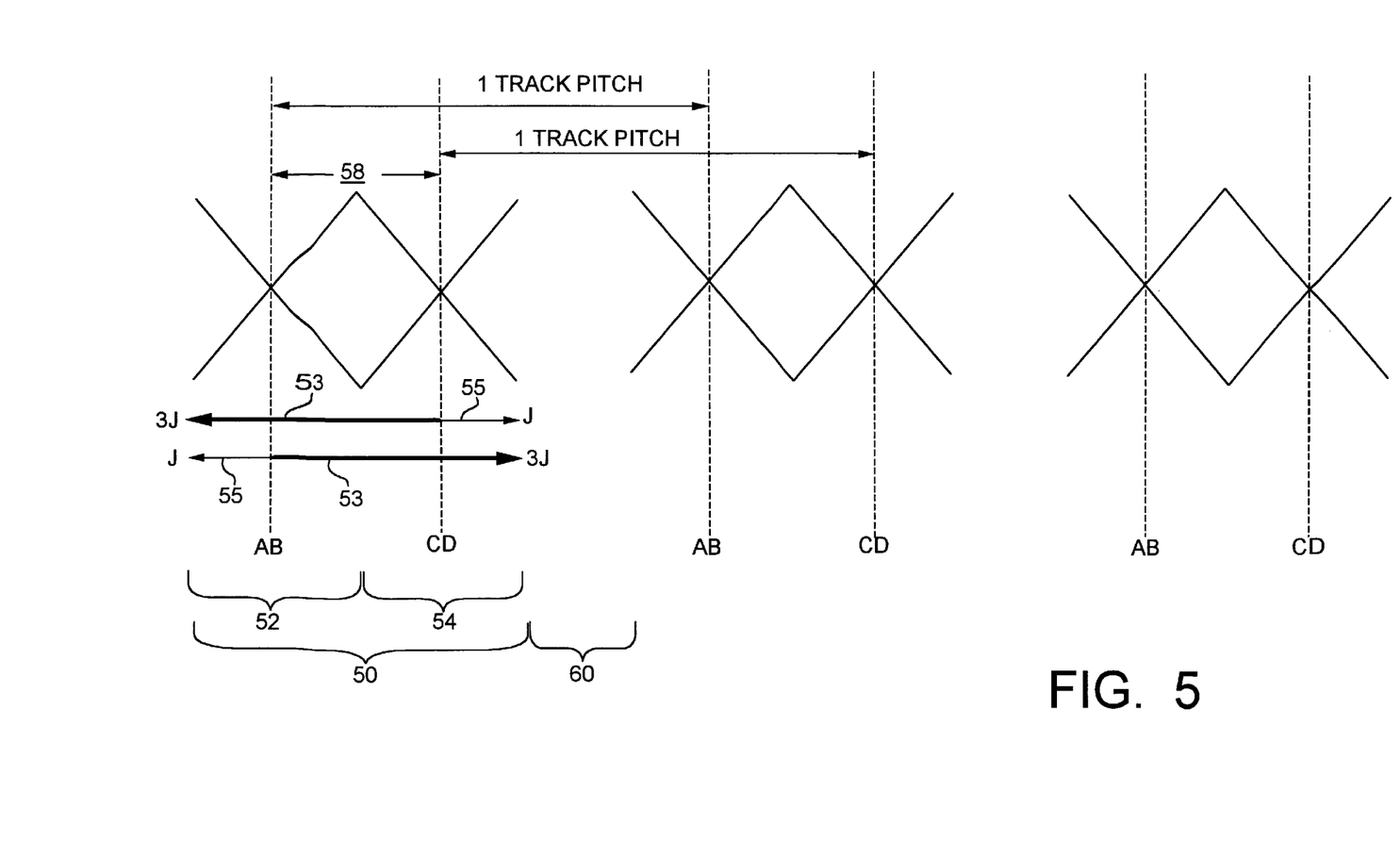
FIG. 5 is a schematic diagram of the linear signals and servo signal crossings generated by radially moving a magnetoresistive read head over a repeating pattern of four servo bursts A, B, C and D according to the invention.

As shown in FIG. 5, however, it is possible to strategically position two repeating servo burst pairs like those shown in FIG. 4 so that the edges of their linear displacement ranges contact or overlap one another to define an extended micro-jogging region 50. The A/B pairs and C/D pairs preferably repeat on whole track pitch intervals, as shown, so that one pair is always used as a reference for writing data tracks. This uniquely permits the servo control system to use the "sweet spot" of one pair as a reference for writing the data tracks to the data track side, and to use the other pair, if necessary, to micro-jog the read head R over the data track for reading. Stated another way, one pair is used for write centering and the other pair is used for read micro-jogging. If the write head W was always skewed positive or always skewed negative, then one pair of bursts (e.g. the A/B bursts) would always be used for write centering and the other pair (e.g. the C/D bursts) would always be used for read micro-jogging. If the write head W crosses over the read head as shown in FIGS. 1A–1C, however, then the A/B bursts would be used for writing in one region of the disk, and the C/D bursts for writing in another. This cross-over scenario is most desirable because it reduces the maximum micro-jogging needed by splitting it between two inverted regions.

FIG. 5 shows the servo signals produced by the A/B servo bursts and the C/D servo bursts as the magnetoresistive read head R is moved radially over the surface of the disk. The point where the signals produced by one of the burst pairs cross and therefore equal one another represents the position of the read head R when the write head W is on the center line of the data track. As shown more clearly in FIGS. 6A and 6C, however, the center line of the data track is actually displaced due to the physical displacement of the write head W. As further shown in FIG. 5, the C/D bursts are located closer to one adjacent pair of A/B bursts crossings than to another. This produces linear regions 52, 54 that contact or overlap one another to form the extended micro-jogging regions 50 that are separated by blind regions 60.

Figure 6A:
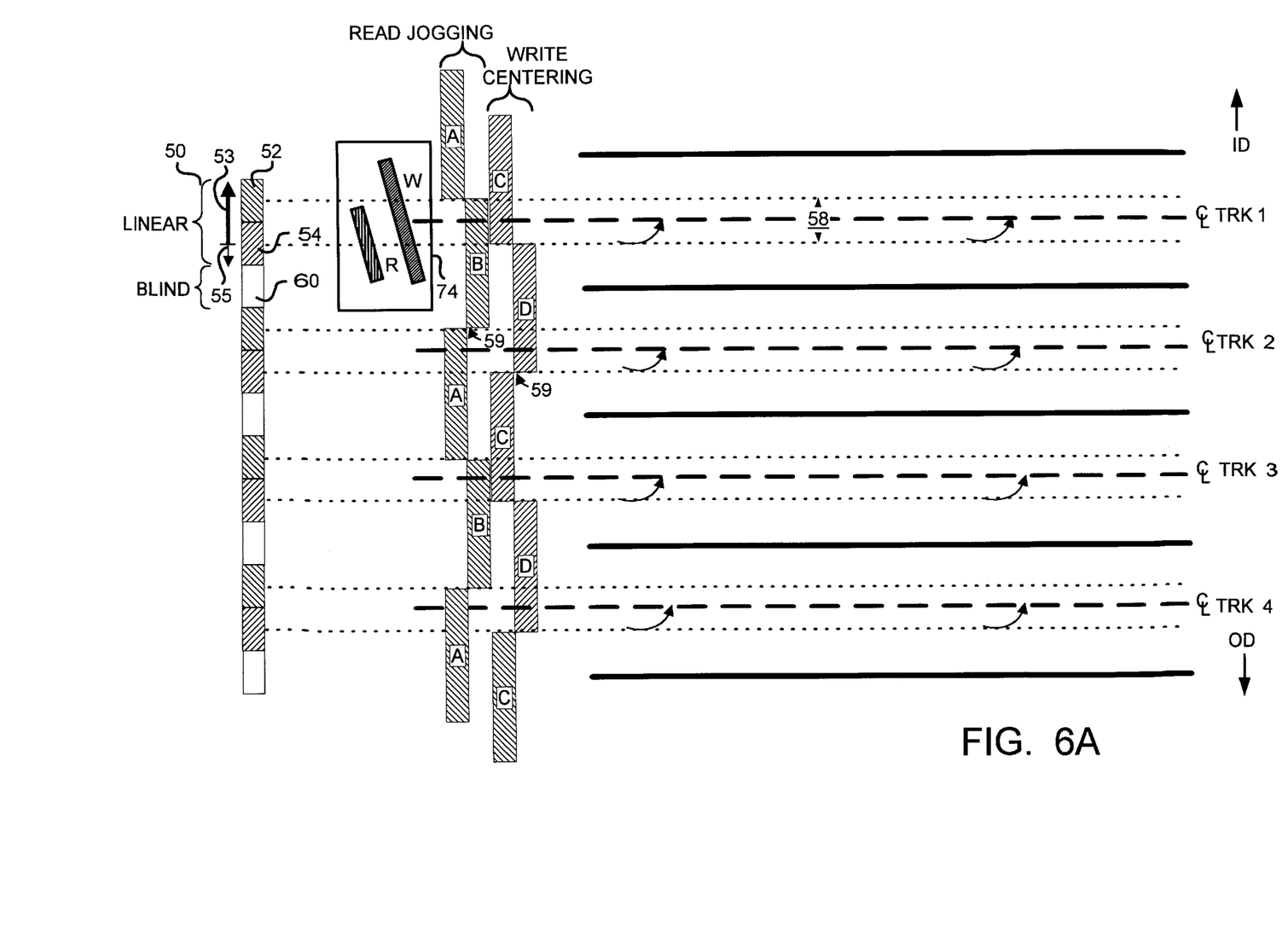
FIG. 6A is a schematic diagram corresponding to FIG. 1A where the write head W is skewed to the inside as the read head R follows the burst pair centerline of the C/D pair for writing and where asymmetrical micro-jogging regions 50 comprising A/B regions 52 and C/D regions 54 are biased to the inside for read micro-jogging.
Figure 6B:
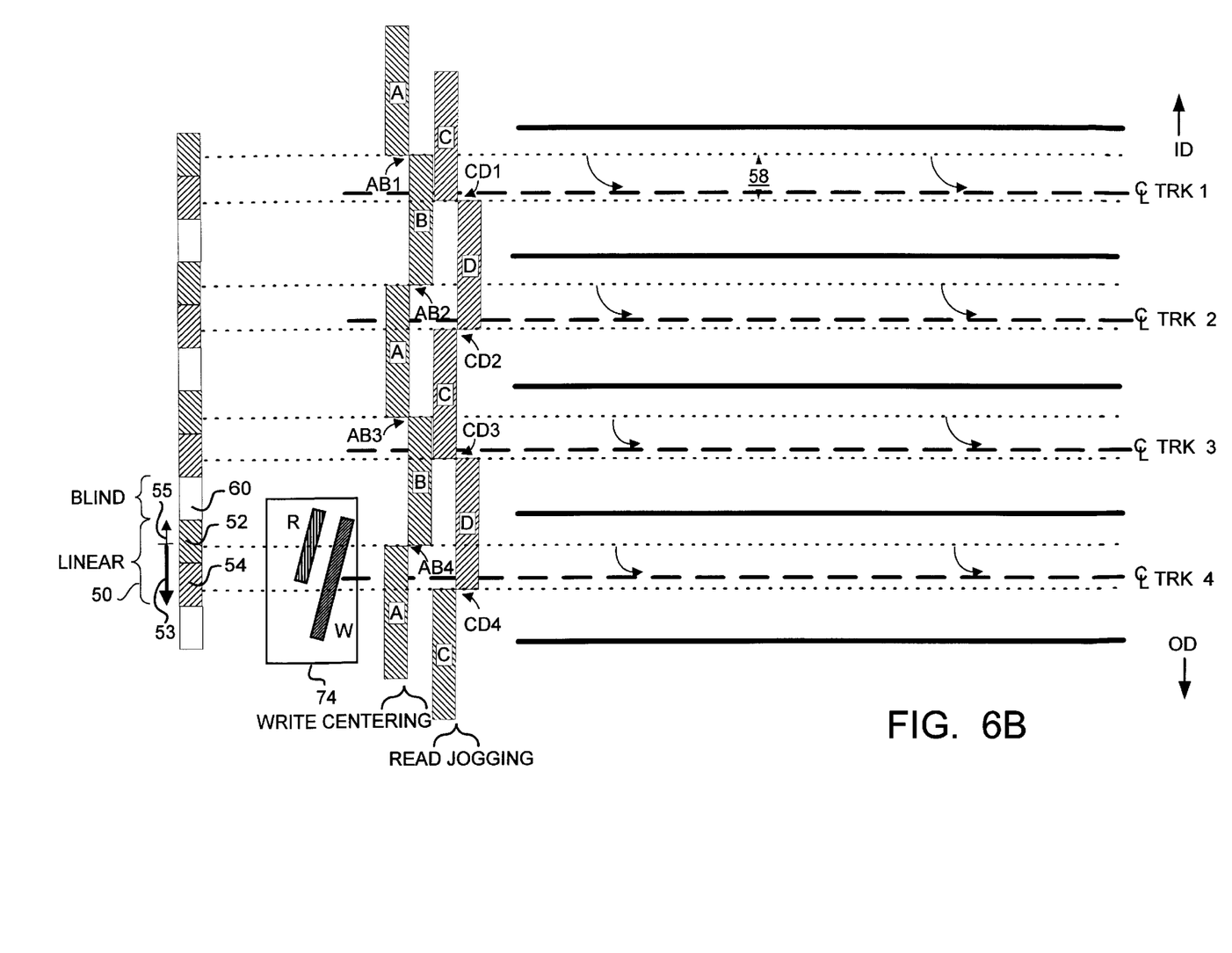
FIG. 6B is a schematic diagram corresponding to FIG. 1C where the write head W is skewed to the outside as the read head R follows the burst pair centerline of the A/B pair for writing and where the asymmetrical micro-jogging regions 50 comprising A/B regions 52 and C/D regions 54 are biased to the outside for read micro-jogging.

If as shown in FIG. 5, 6A, and 6B, the burst pair center line 59 of the C/D bursts is displaced from the burst pair center line 59 of the A/B bursts by a distance 58 equivalent to the linear width of the read head R, then the read head R may be asymmetrically micro-jogged J percentage in one direction and 3J percentage in the other direction. The write centering and asymmetrical read micro-jogging may be selectively accomplished relative to the A/B burst or the C/D bursts, in different regions of the disk. The arrangement of the A/B and C/D servo bursts according to this invention, therefore, may triple the linear micro-jogging distance available to the servo control system in the direction in which it is needed.

FIGS. 6A and 6B correspond to FIGS. 1A and 1C. In FIG. 6A, the magnetoresistive transducer 74 is about to write a first data track TRK1 that is skewed to the inside of a C/D bursts pair. In FIG. 6B, the transducer 74 is about to write a data track TRK1 that is skewed to the outside of an A/B burst pair. In FIG. 6B, for example, to write the first data track TRK1, the servo control system aligns the read head R with the burst pair center line 59 of AB1 or "sweet spot" of the A/B bursts. As a result of such alignment, the data track TRK1 written by the write head W is radially displaced to the outside of the burst pair center line 59 of the A/B bursts. In like fashion, the center line of other tracks, e.g. TRK2, TRK3, etc., are radially displaced from other burst pair centerlines 59 of AB2, AB3, etc . . . , defined by the A/B burst pairs.

In order to read the first track TRK1 with the read head R, the servo control system must micro-jog the read head R away from the centerline 59 of the A/B burst pair and toward the centerline of the data track. As suggested by the linear A/B region 52, identified with cross-hatching corresponding to that of the A/B bursts, the read head R can only be micro13 jogged a limited distance of ±16.67% from the burst pair center line 59 of the A/B burst before it is no longer passing over either the linear region of the A or B burst.

As shown in FIGS. 5, 6A and 6B, it is possible to add only one additional pair of servo bursts C/D to provide a linear C/D region 54 that is strategically located to the data track side of the A/B pair and which has a burst pair center line 59 that is located no farther from the burst pair center line of the first pair than the linear width of the read head R. As a result of this novel arrangement, the A/B burst pairs and C/D burst pairs collectively define a plurality of extended linear regions 50 within which the read head R may be micro-jogged a finite distance from the burst pair centerline used for write centering. Significantly, however, each linear region 50 is asymmetrical relative to the first center line of the burst pair used to write the data track. Accordingly, the read head R may be micro-jogged farther to the "data track side" in the direction shown by arrow 53 as compared to the direction shown by arrow 55. This servo burst pattern provides a plurality of linear regions 50 that are asymmetrically disposed relative to the first centerline and separated from one another by "blind" regions 60. The blind regions 60 do not impact drive performance, however, because the transducer is maintained within the linear response region during track following. During a seek operation, or if the transducer is forced off-track by actuator vibration or a shock event, the servo controller effectively "slides through" the blind region without attempting to maintain precise control.

A significant advantage of the invention is that the servo control system may align with either the A/B burst pair or with the C/D burst pair when writing a data track. The servo control system may therefore use the C/D burst pair for writing data tracks when the read head R will be micro-jogged inside for reading (as shown for example in FIGS. 1A and 6A) and use the A/B burst pair for writing data tracks when the read head R will be micro-jogged outside for reading the data tracks (as shown for example in FIGS. 1C and 6B). As one can imagine, this feature of the invention is most applicable to the situation shown by the middle line 32 of FIG. 2 where the displacement of the write head W varies, or flip-flops, from a negative percentage to a positive percentage.

At a middle diameter such as that shown in FIG. 1B, where the read and write heads R, W are aligned with one another, it does not matter which burst pair is used for reading the data track because the amount of micro-jogging needed within this middle region can be accommodated by the same burst pair used for writing. The transition between regions where the A/B pair must be used for writing and where the C/D pair must be used for writing, therefore, can simply occur somewhere within a middle region in which writing and micro-jogging can be accommodated by only one pair of servo bursts.

The present invention can be viewed as a plurality of discrete linear regions which are asymmetrically biased toward the side which the read head R must be micro-jogged to properly align the read head R with the earlier written data track. As a result of uniquely providing discrete linear regions, only where necessary, it is possible to write the servo burst pattern with relatively few servo bursts, and to use conventional full track width bursts reducing the servo writing time during manufacture of the drive, and reduce the number of servo writers necessary for a given production rate. This is extremely significant because the servo writing time generally constitutes a bottleneck within the manufacturing process and because the servo writing devices are extremely expensive.

The above disclosure has been provided to teach a novel servo burst pattern which strategically increases the linear micro-jogging region available to a servo control system to accommodate a relatively large read-to-write-head displacement percentage, even where that displacement varies in direction from an inside diameter to an outside diameter of the magnetic disk, and which does so without unduly narrowing the servo bursts, and therefore without unnecessarily impacting the time needed to write the servo burst pattern or requiring the purchase of additional servo writers.

We claim:

1. In a magnetic storage disk drive having a disk with a plurality of concentric data tracks which are spaced apart by a track pitch, a read head having a finite linear response width which is less than one-half the track pitch and a write head being longitudinally spaced apart from the read head within a common structure, a servo burst pattern uniformly repeated from data track to data track for increasing the radial distance within which the read head can be micro-jogged, the servo burst pattern comprising:

a first pair of servo bursts that collectively define a first burst pair centerline associated with a particular data track, for centering the read head on the first burst pair centerline to position the write head to write data on the particular data track with the write head being skewed from the read head relative to the first burst pair centerline; and a second pair of servo bursts that collectively define a second burst pair centerline that is located within the finite linear response width of the read head relative to the first burst pair centerline and closer to the first burst pair centerline associated with the particular data track than to a burst pair centerline associated with an adjacent data track to define an asymmetrical micro-jogging region relative to the first burst pair centerline that is bounded by nonlinear regions and extends a first distance from the first burst pair centerline in an inverse data track direction away from the particular data track and the second burst pair centerline and a second greater distance from the first burst pair centerline in a data track direction toward the particular data track and the second burst pair centerline;

whereby the read head can be micro-jogged within the asymmetrical micro-jogging region to center the read head on the particular data track while reading data.

2. The magnetic storage disk drive of claim 1 wherein each servo burst spans a full track pitch.

3. The magnetic storage disk drive of claim 1 wherein the second burst pair centerline is located substantially at the finite linear response width of the read head relative to the first burst pair centerline such that the asymmetrical micro-jogging region extends substantially one unit of distance in the inverse data track direction and substantially three units of distance in the data track direction.

4. The magnetic storage disk drive of claim 1 wherein the first burst pair centerline is radially outside of the particular data track and the second burst pair centerline.

5. The magnetic storage disk drive of claim 1 wherein the first burst pair centerline is radially inside of the particular data track and the second burst pair centerline.

6. The magnetic storage disk drive of claim 1 wherein a first plurality of the first burst pair centerlines are radially inside of corresponding second burst pair centerlines and particular data tracks in a first annular region of the disk and wherein a second plurality of the first burst pair centerlines are radially inside of corresponding second burst pair centerlines particular data tracks and in a second annular region of the disk.

7. The magnetic storage disk drive of claim 6 wherein the plurality of first burst pair centerlines and corresponding second burst pair centerlines are defined by a uniformly repeating pattern of A/B burst pairs and C/D burst pairs.

8. The magnetic storage disk drive of claim 7 wherein the A/B burst pairs define the plurality of first burst pair centerlines in the first annular region of the disk and wherein the C/D burst pairs define the plurality of first burst pair centerlines in the second annular region of the disk.

9. The magnetic storage disk drive of claim 7 wherein the A/B burst pairs define the plurality of first burst pair centerlines in the second annular region of the disk and wherein the C/D burst pairs define the plurality of first burst pair centerlines in the first annular region of the disk.

10. In a magnetic storage disk drive having a disk with a plurality of concentric data tracks which are spaced apart by a track pitch, a read head having a finite linear response width which is less than one-half the track pitch and a write head being longitudinally spaced-apart from the read head within a common structure, a servo burst pattern uniformly repeated from data track to data track for increasing the radial distance within which the read head can be micro-jogged, the servo burst pattern comprising:

a first pair of servo bursts that each span a full track pitch and collectively define a first burst pair centerline associated with a particular data track, for centering the read head on the first burst pair centerline to position the write head to write data on the particular data track with the write head being skewed from the read head relative to the first burst pair centerline; and a second pair of servo bursts that each span a full track pitch and collectively define a second burst pair centerline that is located within the finite linear response width of the read head relative to the first burst pair centerline and closer to the first burst pair centerline associated with the particular data track than to a burst pair centerline associated with an adjacent data track to define an asymmetrical micro-jogging region relative to the first burst pair centerline that extends a first distance from the first burst pair centerline in an inverse data track direction away from the particular data track and the second burst pair centerline and a second greater distance from the first burst pair centerline in a data track direction toward the particular data track and the second burst pair centerline;

whereby the read head can be micro-jogged within the asymmetrical micro-jogging region to center the read head on the particular data track while reading data.

11. The magnetic storage disk drive of claim 10 wherein the first burst pair centerline is radially outside of the particular data track and the second burst pair centerline.

12. The magnetic storage disk drive of claim 10 wherein the first burst pair centerline is radially inside of the particular data track and the second burst pair centerline.

13. The magnetic storage disk drive of claim 10 wherein a first plurality of the first burst pair centerlines are radially inside of corresponding second burst pair centerlines and particular data tracks in a first annular region of the disk and wherein a second plurality of the first burst pair centerlines are radially inside of corresponding second burst pair centerlines particular data tracks and in a second annular region of the disk.

14. The magnetic storage disk drive of claim 13 wherein the plurality of first burst pair centerlines and corresponding second burst pair centerlines are defined by a uniformly repeating pattern of A/B burst pairs and C/D burst pairs.

15. The magnetic storage disk drive of claim 14 wherein the A/B burst pairs define the plurality of first burst pair centerlines in the first annular region of the disk and wherein the C/D burst pairs define the plurality of first burst pair centerlines in the second annular region of the disk.

16. The magnetic storage disk drive of claim 14 wherein the A/B burst pairs define the plurality of first burst pair centerlines in the second annular region of the disk and wherein the C/D burst pairs define the plurality of first burst pair centerlines in the first annular region of the disk.

* * * * *